J. T. COOPER.
COMBINED FURNACE AND COOKING STOVE.
APPLICATION FILED APR. 4, 1911.
1,084,538.
Patented Jan. 13, 1914.
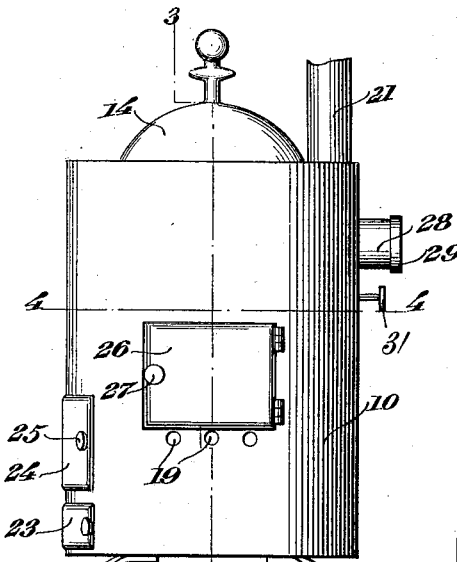
Fig. 1
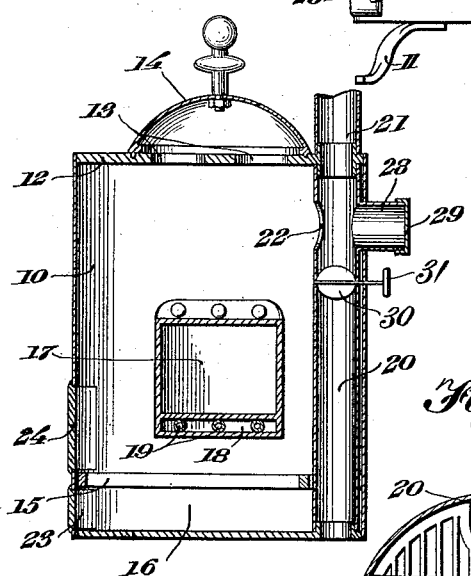
Fig. 2
Fig. 3
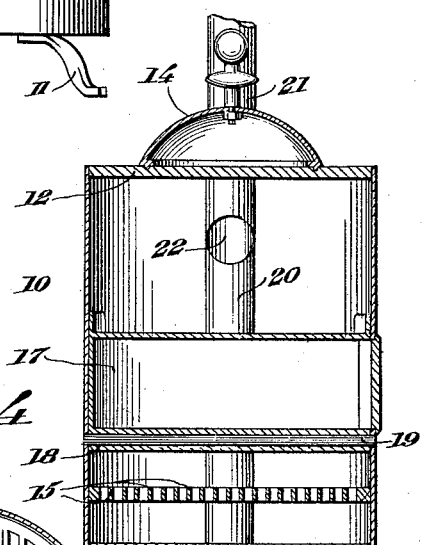
Fig. 4
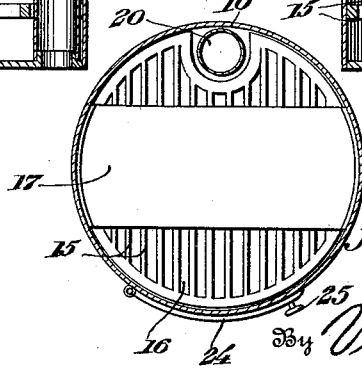
Witnesses
A. W. Gardes
Inventor
Joseph T. Cooper
By Victor J. Evans
Attorney

UNITED STATES PATENT OFFICE.

JOSEPH T. COOPER, OF LEBANON, KENTUCKY.

COMBINED FURNACE AND COOKING-STOVE.

1,084,538.

Specification of Letters Patent. Patented Jan. 13, 1914.

Application filed April 4, 1911. Serial No. 618,869.

*To all whom it may concern:*

Be it known that I, JOSEPH T. COOPER, a citizen of the United States, residing at Lebanon, in the county of Marion and State of Kentucky, have invented new and useful Improvements in Combined Furnaces and Cooking-Stoves, of which the following is a specification.

The invention relates to stoves and furnaces, more particularly to combined furnaces and cooking stoves and has for an object to provide a device that can be used to either heat a room or can be employed for cooking purposes.

The invention embodies, among other features, a stove which can be conveniently employed for heating purposes, as for instance to supply heat to a room or the stove can be used as a cooking stove, as will be readily apparent from the following description.

Reference is to be had to the accompanying drawings constituting a part of this specification, in which similar characters of reference denote corresponding parts in all the views and in which—

Figure 1 is a side elevation. Fig. 2 is a longitudinal sectional view. Fig. 3 is a sectional view taken on the line 3—3 in Fig. 1. Fig. 4 is a sectional view taken on the line 4—4 in Fig. 1.

Referring more particularly to the views I provide a casing 10 mounted on suitable supports 11 and having a top 12 provided with openings 13 adapted to constitute apertures for suitable cooking receptacles and normally covered by an urn 14 for removable engagement with the top 12. Disposed in the casing 10 is a grate 15 beneath which a space 16 is provided constituting an ash pit and over and spaced from the grate 15 is disposed an oven 17 having a compartment 18 beneath the same, the said compartment being provided with air flues 19 extending therethrough, the said flues being adapted to receive air from a room and convey the same beneath the oven 17 so that the air will be heated when it leaves the casing 10. A vertically extending cold air flue 20 is provided in the rear of the casing 10 and has connection with a chimney pipe 21, an opening 22 being provided for permitting the smoke from the fire in the casing 10 to pass outwardly into the cold air flue 20 and thence into the chimney pipe 21. A door 23 is mounted on the lower portion of the casing 10 adjacent the grate 15, the said door being provided so that the combustion in the casing can be readily controlled. The furnace door 24 having a handle 25 is mounted on the casing 10 exteriorly thereof and an oven door 26 having a handle 27 is hingedly mounted on the casing 10 so that access can be gained to the oven 17.

In the use of my device when it is desired to use the same for heating purposes, the urn 14 is disposed on the top of the furnace to close the openings 13 and a fire having been started in the casing 10 on the grate 15, the resulting heat will radiate from the casing and heat the room. By providing the air flues 19, the air will tend to circulate through the flues and become heated after which it will mingle with the colder air in the room, thus tending to heat the same. As cold air tends to move downwardly and warm air tends to rise, the cold air circulating around the lower end of the casing 10 will move upwardly through the flue 20, and be carried outwardly through the stove pipe.

When it is desired to use my device as a cooking stove the urn 14 is removed from the casing 10 and various cooking receptacles can then be disposed over the opening 13, the oven 17 being adapted to be used in baking or broiling various products.

For the convenient use of the device disclosed, a second stove pipe 28 is shown extending laterally outward from the casing 10 and at right angles to the chimney pipe 21, a cap 29 being provided for removable engagement with either of the pipes, the cap 29 being mounted on one of the pipes when the other is in use. To control the amount of air passing through the flue 20 a damper 30 of any ordinary type is mounted to swing in the flue 20, the said damper having a suitable handle 31 arranged exteriorly of the flue, as shown in Figs. 1 and 2.

My device is preferably adapted to be made in a small compact form so that the same can be conveniently carried in a wagon or vehicle, thus constituting a combined portable furnace and cooking stove.

Although for the purpose of describing my invention I have shown a particular construction thereof it will be understood that the scope of the invention is defined in the appended claim and that various departures may be made from the construction shown, provided I do not depart from the spirit of the invention.

Having thus fully described the invention, what I claim as new, is:—

A combined furnace and cooking stove comprising a casing having a cold air flue extending from the base to the top of the casing and provided with an opening to the interior of the casing, a damper in the flue for controlling the flow of cold air through the cold air flue and thereby controlling the draft from the interior of the casing through the said opening to the cold air flue, a grate mounted in the casing and spaced from the floor to provide an ash pit, an oven in the casing, a compartment formed between the said oven and the said grate and arranged horizontally in the casing, and a series of flues mounted in parallel relation to the compartment and extending horizontally through the casing.

In testimony whereof I affix my signature in presence of two witnesses.

JOSEPH T. COOPER.

Witnesses:
J. P. HUNDLEY,
T. H. COOPER.

Copies of this patent may be obtained for five cents each, by addressing the "Commissioner of Patents, Washington, D. C."